US007241489B2

(12) United States Patent
Argoitia et al.

(10) Patent No.: US 7,241,489 B2
(45) Date of Patent: Jul. 10, 2007

(54) OPAQUE FLAKE FOR COVERT SECURITY APPLICATIONS

(75) Inventors: Alberto Argoitia, Santa Rosa, CA (US); Paul G. Coombs, Santa Rosa, CA (US); Charles T. Markantes, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 273 days.

(21) Appl. No.: 10/762,158

(22) Filed: Jan. 20, 2004

(65) Prior Publication Data

US 2004/0151827 A1   Aug. 5, 2004

Related U.S. Application Data

(63) Continuation-in-part of application No. 10/641,695, filed on Aug. 14, 2003, and a continuation-in-part of application No. 10/243,111, filed on Sep. 13, 2002, now Pat. No. 6,902,807.

(51) Int. Cl.
*B32B 5/66* (2006.01)

(52) U.S. Cl. ............... 428/323; 428/328; 428/403; 428/407

(58) Field of Classification Search ............... 428/323, 428/328, 403, 407
See application file for complete search history.

(56) References Cited

U.S. PATENT DOCUMENTS

| | | | |
|---|---|---|---|
| 2,570,856 A | 10/1951 | Pratt et al. .................. 41/32 |
| 3,123,490 A | 3/1964 | Bolomey et al. ........... 106/291 |
| 3,610,721 A | 10/1971 | Abramson et al. ........... 350/3.5 |
| 3,627,580 A | 12/1971 | Krall ...................... 117/238 |
| 3,633,720 A | 1/1972 | Tyler ...................... 400/105 |
| 3,676,273 A | 7/1972 | Graves ...................... 161/3 |
| 3,790,407 A | 2/1974 | Merten et al. ............... 117/240 |
| 3,791,864 A | 2/1974 | Steingroevor ............... 117/238 |
| 3,845,499 A | 10/1974 | Ballinger ................... 346/743 |
| 3,853,676 A | 12/1974 | Graves ...................... 161/5 |
| 3,873,975 A | 3/1975 | Miklos et al. ............... 360/25 |
| 4,011,009 A | 3/1977 | Lama et al. ............... 359/571 |
| 4,054,922 A | 10/1977 | Fichter .................... 346/74.3 |
| 4,099,838 A | 7/1978 | Cook et al. ............... 359/571 |
| 4,197,563 A | 4/1980 | Michaud .................. 346/74.3 |
| 4,271,782 A | 6/1981 | Bate et al. ............... 118/623 |
| 4,398,798 A | 8/1983 | Krawczak et al. ........... 359/573 |
| 4,543,551 A | 9/1985 | Peterson .................. 335/284 |
| 4,788,116 A | 11/1988 | Hochberg .................. 430/21 |
| 4,867,793 A | 9/1989 | Franz et al. ............... 106/415 |
| 4,931,309 A | 6/1990 | Komatsu et al. ........... 427/599 |
| 5,079,058 A | 1/1992 | Tomiyama ................. 428/40 |
| 5,079,085 A | 1/1992 | Hashimoto et al. ......... 428/327 |
| 5,177,344 A | 1/1993 | Pease ..................... 235/449 |
| 5,192,611 A | 3/1993 | Tomiyama et al. ......... 428/354 |
| 5,223,360 A | 6/1993 | Prengel et al. ............. 430/39 |
| 5,364,689 A | 11/1994 | Kashiwagi et al. ......... 428/195.1 |
| 5,368,898 A | 11/1994 | Akedo .................... 427/510 |
| 5,424,119 A | 6/1995 | Phillips et al. ............. 428/328 |
| 5,474,814 A | 12/1995 | Komatsu et al. ........... 427/549 |
| 5,613,022 A | 3/1997 | Odhner et al. .............. 385/37 |
| 5,624,076 A | 4/1997 | Miekka et al. .............. 241/3 |
| 5,627,663 A | 5/1997 | Horan et al. ............... 359/2 |
| 5,630,877 A | 5/1997 | Kashiwagi et al. ......... 118/623 |
| 5,672,410 A | 9/1997 | Miekka et al. ............. 428/148 |
| 5,744,223 A | 4/1998 | Abersfelder et al. ....... 428/206 |
| 5,811,775 A | 9/1998 | Lee ........................ 235/457 |
| 5,991,078 A | 11/1999 | Yoshitake et al. .......... 359/567 |
| 6,033,782 A | 3/2000 | Hubbard et al. ........... 428/407 |
| 6,043,936 A | 3/2000 | Large ..................... 359/572 |
| 6,068,691 A | 5/2000 | Miekka et al. ............. 106/403 |
| 6,103,361 A | 8/2000 | Batzar et al. ............. 428/323 |
| 6,168,100 B1 | 1/2001 | Kato et al. ................ 241/1 |
| 6,403,169 B1 | 6/2002 | Hardwick et al. .......... 427/548 |
| 6,549,131 B1 | 4/2003 | Cote et al. ............... 340/572.1 |
| 6,589,331 B2 | 7/2003 | Ostertag et al. ........... 106/460 |

(Continued)

FOREIGN PATENT DOCUMENTS

DE    4212290    5/1993

(Continued)

OTHER PUBLICATIONS

Halliday et al, "Fundamentals of Physics, Sixth Edition", p. 662, Jul. 2000.

(Continued)

*Primary Examiner*—Leszek Kiliman
(74) *Attorney, Agent, or Firm*—Allen, Dyer, Doppelt, Milbrath & Gilchrist, P.A.

(57) ABSTRACT

Opaque flakes, such as pigment or bright flake used in paints and inks, have a selected shape and/or other indicia to provide a covert security feature to an object. In some embodiments the composition includes base pigment, and the opaque covert flakes match the visual characteristics of the base pigment. In another embodiment, opaque covert flakes are mixed in the carrier with base pigment at a concentration sufficient to avoid changing the appearance of the composition. In another embodiment, opaque covert flakes are mixed in a clear or tinted varnish base that can be applied over an existing security feature. Shaped opaque covert flakes are not readily detectable by causal observation, but in some embodiments are easily seen at 100× magnification.

21 Claims, 2 Drawing Sheets

U.S. PATENT DOCUMENTS

| | | |
|---|---|---|
| 6,643,001 B1 | 11/2003 | Faris .......................... 356/37 |
| 6,649,256 B1 | 11/2003 | Buczek et al. .............. 428/323 |
| 6,692,830 B2 | 2/2004 | Argoitia et al. ............. 428/403 |
| 6,749,777 B2 | 6/2004 | Argoitia et al. ............. 252/582 |
| 6,749,936 B2 | 6/2004 | Argoitia et al. ............. 428/402 |
| 6,759,097 B2 | 7/2004 | Phillips et al. ............. 427/510 |
| 6,808,806 B2 | 10/2004 | Phillips et al. ............. 428/403 |
| 6,815,065 B2 | 11/2004 | Argoitia et al. ............. 428/403 |
| 6,841,238 B2 | 1/2005 | Argoitia et al. ............. 428/323 |
| 6,902,807 B1 | 6/2005 | Argoitia et al. ............. 428/403 |
| 6,987,590 B2 | 1/2006 | Phillips et al. ................. 359/2 |
| 7,047,883 B2 | 5/2006 | Raksha et al. .............. 101/489 |
| 2002/0021003 A1 | 2/2002 | McGrew ...................... 283/93 |
| 2004/0009309 A1 | 1/2004 | Raksha et al. .............. 427/598 |
| 2004/0105963 A1 | 6/2004 | Bonkowski et al. ...... 428/195.1 |
| 2004/0151827 A1 | 8/2004 | Argoitia et al. ................ 427/7 |
| 2005/0037192 A1 | 2/2005 | Argoitia et al. ............. 428/323 |
| 2005/0106367 A1 | 5/2005 | Raksha et al. .............. 428/199 |
| 2005/0123755 A1 | 6/2005 | Argoitia et al. ............. 428/402 |

FOREIGN PATENT DOCUMENTS

| | | |
|---|---|---|
| EP | 0341002 | 11/1989 |
| EP | 0556449 | 8/1993 |
| EP | 406667 | 1/1995 |
| EP | 710508 | 5/1996 |
| EP | 0953937 | 11/1999 |
| EP | 0 978 373 A2 | 2/2000 |
| EP | 1239307 | 9/2002 |
| EP | 1 353 197 | 10/2003 |
| EP | 1 498 545 A | 1/2005 |
| GB | 1107395 | 3/1968 |
| GB | 1131038 | 10/1968 |
| JP | 63172279 | 7/1988 |
| WO | WO88/07214 | 9/1988 |
| WO | WO 95/13569 | 5/1995 |
| WO | 00/08596 * | 2/2000 |
| WO | WO 00/08596 | 2/2000 |
| WO | WO 01/03945 A1 | 1/2001 |
| WO | WO 01/53113 A | 7/2001 |
| WO | WO 02/40599 A1 | 5/2002 |
| WO | WO 02/40600 | 5/2002 |
| WO | WO 02/053677 A1 | 7/2002 |
| WO | WO02/090002 | 11/2002 |
| WO | WO 03/102084 A1 | 12/2003 |
| WO | 2004/024836 | 3/2004 |
| WO | WO2005/017048 | 2/2005 |

OTHER PUBLICATIONS

Argoitia et al, "Pigments Exhibiting Diffractive Effects", Soc. of Vac. Coaters, 45th Annual Tech. Conf. Peoceed. (2002).

Argoitia et al, "The concept of printable holograms through the alignment of diffractive pigments", SPIE Conference on Document Security, Jan. 2004.

Coombs et al, "Integration of contracting technologies into advanced optical security devices", SPIE Conference on Document Security, Jan. 2004.

Liewellyn, "Dovids: Functional Beauty—discussion about holography", Paper, Film, and Foil Converter, Aug. 2002.

Hardin, "Optical tricks designed to foil counterfeiters", OE Reports, No. 191, Nov. 1999.

Argoitia and Witzman, Pigments Exhibiting Diffractive Effects, Soc. Of Vac. Coaters, 45th Annual Tech. Conf. Proceed. (2002).

Powell et al. (ED), "Vapor Disposition", John Wiley & Sons, p. 132, 1996.

Van Renesse (Ed.), "Optical Document Security", 2nd Ed., Artech House 254, 349-69 (1997).

Lotz et al., *Optical Layers on Large Area Plastic Films*, Precision, Applied Films (Nov. 2001).

Himpsel et al., *Nanowires by Step Decoration*, Mat. Research Soc. Bul., pp. 20-24 (Aug. 1999).

Prokes and Wang (ED.), *Novel Methods of Nanoscale Wire Formation*, Mat. Research Soc. Bul., pp. 13-14 (Aug. 1999).

Dobrowolski et al., "Research on Thin Film Anticounterfeiting Coatings at the National Research Council of Canada", Applied Optics, vol. 28, No. 14, pp. 2702-2717, Jul. 15, 1989.

* cited by examiner

OPAQUE FLAKE FOR COVERT SECURITY APPLICATIONS

CROSS-REFERENCE TO RELATED APPLICATIONS

This patent application is a continuation-in-part of commonly owned, co-pending U.S. patent application Ser. No. 10/641,695 entitled FLAKE FOR COVERT SECURITY APPLICATIONS by Alberto Argoitia, Paul G. Coombs, and Charles T. Markantes, filed Aug. 14, 2003, the disclosure of which is hereby incorporated in its entirety for all purposes.

This patent application is also a continuation-in-part of commonly owned, co-pending U.S. patent application Ser. No. 10/243,111 entitled ALIGNABLE DIFFRACTIVE PIGMENT FLAKES by Alberto Argoitia, Vladimir P. Raksha, and Dishuan Chu, filed Sep. 13, 2002 now U.S. Pat. No. 6,902,807, the disclosure of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to thin-film pigment flakes, and more particularly to opaque inorganic taggant flakes for use in a coating composition.

BACKGROUND OF THE INVENTION

Specialty pigments have been developed for use in security applications, such as anti-counterfeiting devices printed on banknotes, packaging of high-value items, seals for containers, and even for direct application to commercial items. For example, the U.S. twenty-dollar Federal Reserve Note currently uses optically variable ink. The number "20" printed in the lower-right corner of the face of the note changes color as the viewing angle changes. This is an overt anti-counterfeiting device. The color-shifting effect is not reproducible by ordinary color photocopiers, and someone receiving a note can observe whether it has the color-shifting security feature to determine the note's authenticity.

Other high-value documents and objects use similar measures. For example, iridescent pigments or diffractive pigments are used in paints and inks that are applied directly to an article, such as a stock certificate, passport, original product packaging, or to seals that are applied to an article. Security features that are more difficult to counterfeit are desirable as counterfeiters continue to become more sophisticated.

One anti-counterfeiting approach uses microscopic symbols on multi-layer color-shifting pigment flakes. The symbols are formed on at least one of the layers of the multi-layer color-shifting pigment flakes by a local change of an optical property(s), such as reflectivity. The multi-layer color-shifting pigment flakes generally include a Fabry Perot-type structure having an absorbing layer separated from a reflective layer by a spacer layer. The reflective layer is typically a layer of metal, which renders the pigment flake essentially opaque. If a large portion of these types of pigment flakes are mixed with other pigment, the resultant color might be significantly different from the pigment, and if too few of these flakes are mixed with other pigment, they might be difficult to find.

Another technique uses epoxy-encapsulated shaped flakes of polyethylene terephthalate ("PET"). A reflective layer is deposited on a roll of PET, and then the PET is cut into pieces. The flakes are coated or encapsulated with epoxy to improve the durability of the reflective layer. These flakes are available in a variety of shapes, such as square, rectangle, hexagon, and "apostrophe," and a selection of reflective metallic tints, such as silver, pewter, gold, and copper. However, the epoxy layer and the relatively thick PET substrate (which typically has a minimum thickness of about 13 microns (0.5 mils) for use in vacuum deposition processes) result in a relatively thick flake, typically greater than 14 microns. Unfortunately, such a thick flake is not desirable for use in covert applications where the thickness is substantially greater than the base pigment. Similarly, such thick flakes do not flow well in inks, and create lumps in paint. When paint includes a thick flake that creates a rough surface, a relatively thick clear topcoat is typically applied over the rough surface.

It is desirable to mark objects with covert anti-counterfeiting devices that overcome the limitations of the techniques discussed above.

BRIEF SUMMARY OF THE INVENTION

A coating composition includes covert opaque flakes less than about 10 microns thick with identifying indicia. Examples of identifying indicia include selected flake shape(s) and/or compositions. The covert flakes are typically dispersed in a carrier, such as a varnish base, paint vehicle or ink vehicle, to form a coating composition. The covert flakes are dispersed in sufficiently dilute concentration so that the covert flakes are not easily detectable in the coating composition by casual observation and are colored to match the color of a base pigment or have a different optical characteristic, such as being highly reflective ("bright" or "silver"). The shapes of selectively shaped covert flakes are not discerned by unaided human vision, but can be seen under about 50× to 300× magnification. In one embodiment, the covert flakes appear to be essentially identical to base pigment flakes in the composition, but are made of different thin-film layers that are detectable using standard analytical methods.

In a particular embodiment the covert flakes are a single layer of a shaped inorganic dielectric material, such as ZnS. The thickness of the single layer of inorganic dielectric material is selected to provide a covert flake that has color to match a mica-based nacreous base pigment.

A composition according to an embodiment of the present invention is applied to an object to provide a covert security feature. A pigmented composition may be used to print a field (e.g. an image) on the object, and a varnish composition with a low concentration of opaque security flakes may be used to overprint an existing image on the object. In an embodiment of the invention, covert flake is mixed with base pigment to provide a covert security feature to images printed with the composition that look substantially similar to images printed with only the base pigment.

DETAILED DESCRIPTION OF THE INVENTION

I. Introduction

Flakes for covert security applications are not typically seen by casual observation. Some sort of inspection technique, such as inspection under a microscope or analytical technique, such as elemental analysis, is used. In one embodiment, opaque flakes containing indicia, such as a particular shape, substantially match the visual characteristics of a bulk pigment or other substance they are mixed with. In a particular embodiment, a single-layer inorganic opaque flake having a selected shape is mixed with an iridescent mica-based flake or other base pigment. For the purpose of this discussion, a "single layer" of inorganic material includes multiple layers of the same inorganic material built up upon each other.

Inorganic covert flakes are particularly desirable in applications where heat, solvents, sunlight, or other factors may degrade organic flakes. For example, an inorganic covert flake used in an explosive is detectable even after exposure to high temperatures and/or pressures, and is persistent in the environment. Flakes according to embodiments of the present invention also are substantially thinner, typically less than about 10 microns, than conventional shaped flakes, enabling their use in ink and produce a smooth surface finish in paints without having to use a clear topcoat. Thin, inorganic flakes according to embodiments of the present invention also have a density closer to the density of base pigment flakes made using similar techniques. Thick flakes incorporating organic substrates often have a different density than thin-film base pigment flake, and may segregate, either before or during application while the carrier is fluid. Flake segregation is undesirable because it can result in an inconsistent ratio of covert and base flakes in a composition, and may degrade the covert nature of the covert flakes if segregation results in an unduly high concentration of covert flakes.

II. Exemplary Opaque Flake

Figure 1:
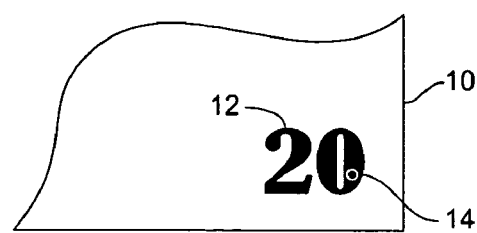
FIG. 1 is a plan view of a portion of a document with a security feature according to an embodiment of the present invention.

FIG. 1 is a plan view of a portion of a document 10 with a security feature 12 according to an embodiment of the present invention. At least a portion 14 of the security feature 12 is printed with ink or paint including opaque flakes having indicia (hereinafter "covert flakes") mixed with bulk pigment, such as bulk pigment flakes. In one embodiment, the covert flakes have a particular shape, such as being square, rectangular, trapezoidal, "diamond" shaped, or round, for example. In another embodiment, the covert flakes include a grating pattern, with or without having a selected shape. In a particular embodiment, the grating pattern has a grating spacing that is not optically active in the visible range of the spectrum. That is, these grating patterns do not form a visible diffraction grating. Covert flakes are also sometimes referred to as taggent flakes, although not all taggent flakes are necessarily covert flakes.

Generally, bulk pigment particles, including bulk pigment flakes, have an irregular shape. In one embodiment, the covert flakes are distinguishable from bulk pigment flakes by their shape. Alternatively, bulk pigment flakes have a first selected shape, and the covert flakes have a second selected shape. Production of shaped pigment flakes is accomplished by a variety of techniques, such as using a patterned substrate to deposit the flake material on the substrate and then separating the flake from the substrate to obtain the pattern, or using a laser or other means to cut the patterned flakes from a sheet of flake material. The selected shape of the covert flakes may be associated with a manufacturing facility, date of manufacture, or other aspect of the document 10, or ink used in producing the document, for example.

A roll coater is one type of apparatus that can be used to produce selectively shaped or randomly shaped covert flakes according to embodiments of the invention. A roll of a sheet of polymer substrate material (also known as a "web") is passed through a deposition zone(s) and coated with one or more thin film layers. Multiple passes of the roll of polymer substrate back and forth through the deposition zone(s) may be made. The thin film layer(s) is then separated from the polymer substrate and processed into flake. Other apparatus and techniques may be used.

It is generally desirable to limit the total thickness of thin film layers deposited (and hence removed) from a roll of polymer film substrate to less than about 10 microns. PET is one type of polymer film substrate used in roll coaters, and the PET film substrate is usually at least about 13 microns thick. Thinner PET film tends to thermally deform during vacuum deposition processes. Both the heat in the deposition zone and the heat of condensation of the deposited thin-film layer(s) increase the temperature of the polymer substrate as it passes through a deposition zone. Thus, the minimum thickness of flake cut from and incorporating PET film is about 13 microns.

Alternatively, or in addition to, having a selected shape, the covert flakes may include a grating pattern. The grating pattern is embossed on a substrate used in a roll coater prior to depositing thin film layers that are processed into flakes, or otherwise formed. In a further embodiment, a selected amount (percentage) of the deposition substrate surface area is embossed with a grating pattern or shape pattern to obtain a selected amount of covert flakes when the thin film layers are stripped from the deposition substrate and processed into flakes. This technique provides covert flakes with the same optical design (thin film layer composition and thickness) as the base flake. For example, embossing 10% of the deposition substrate surface area with a grating pattern and/or shape pattern would result in a pigment mixture having about 10% covert flakes. Different rolls of deposition substrate are produced with different percentages of embossed surface area to obtain pigment mixtures having different amounts covert flake, or are embossed with different patterns to obtain different shapes and/or grating patterns.

Figure 2A:
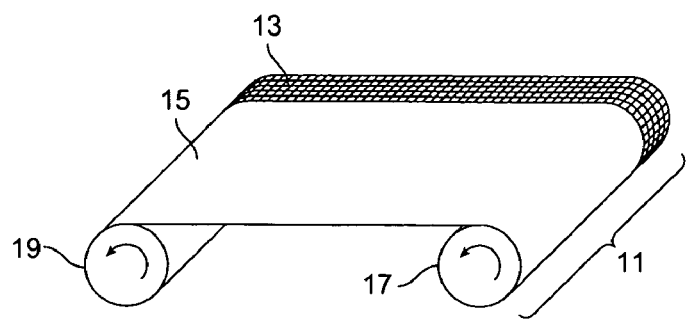
FIG. 2A is a simplified view of a portion of a deposition substrate having an embossed portion and a non-embossed portion.
Figure 2B:
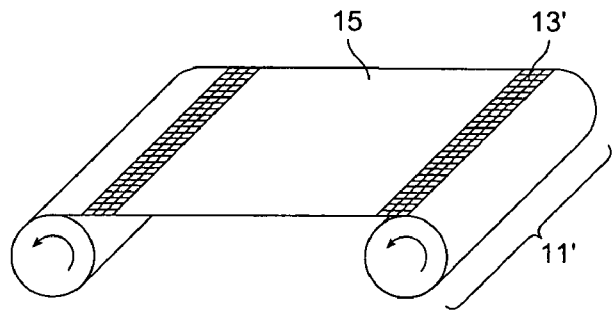
FIG. 2B is a simplified view of a portion of another deposition substrate 11' having an embossed portion 13' and a non-embossed portion 15'

FIG. 2A is a simplified view of a portion of a deposition substrate 11 having an embossed portion 13 and a non-embossed portion 15. The embossed portion has a frame, which is exaggerated for purposes of illustration, and alternatively or optionally has a grating or symbol, for example, and the non-embossed portion is essentially smooth. Alternatively, the non-embossed portion is embossed with a different frame, grating, or symbol. The ratio of the surface area of the embossed portion 13 to the non-embossed portion 15 produces a selected amount of taggent flake (produced from the embossed portion) having the same thin-film structure as the base flake (produced from the non-embossed portion). The deposition substrate 11 travels from one roll 17 to another 19 through a deposition zone (not shown) in a roll coater, but alternative embodiments use different types of substrates and deposition systems. FIG. 2B is a simplified view of a portion of another deposition substrate 11' having an embossed portion 13' and a non-embossed portion 15'.

A pigment flake with identifying indicia provides a security feature even if it is easily observable; however, if a pigment flake with identifying indicia is not easily observable, a counterfeiter might not even be aware that a covert flake is present. One embodiment of the present invention uses covert pigment flake that has the same optical characteristics as the base pigment. The covert pigment flakes are not seen by unaided human vision, but are visible under magnification of about 50× to 300×. Covert pigment flakes having essentially the same visual characteristics can be mixed with base pigment in a wide range of proportions without significantly affecting the color of the composition. In some embodiments, covert pigment flakes are readily identifiable in compositions having 5-10 weight % covert pigment flakes and 95-90 weight % base pigment flakes having similar appearance (e.g. color and/or color travel). Often, shaped opaque covert flakes are easily identifiable in the field using hand-held microscopes (e.g. "shirt-pocket" microscopes), and require less magnification to identify than similar sized flakes having symbols.

Another approach is to use an opaque covert flake with a selected shape that is a different color than the base flake. In one embodiment, the opaque covert flake is a bright metallic ("silver") flake having a thin-film layer of aluminum or other reflector between layers of a dielectric material, such as $MgF_2$. Bright flake is generally highly reflective over a wide range of visible wavelengths, and often does not have a characteristic color. Bright flake made with gold and copper may appear yellowish and reddish, for example. It has been found that between about 0.25 weight % to about 5 weight % of shaped (e.g. "diamond" shaped) bright flake in colored base pigments can be added without causing a noticeable change in color, but are still easily identifiable under illuminated magnification of about 50× (i.e. 50 time magnification). Under illuminated magnification, both the shape and high brightness of the flake distinguish it from the base flake. When less than about 0.25% of shaped bright flake is used the covert flakes become difficult to detect because dilution with the base flake results in fewer shaped bright flakes in the field of view.

When the amount of bright flake exceeds about 5 weight %, the color (e.g. hue) of certain types of flakes, particularly dark colored flakes, changes. In these instances, too much bright flake essentially "dilutes" the color of the base pigment. However, using shaped bright flake in compositions having color-shifting pigment is highly desirable because a single type of shaped bright flake is added in small quantities to many different types (color and/or color travel) of pigment flake, and a relatively small amount of shaped bright flake provides a covert security feature. Similarly, dilution of color is not critical in applications where compositions containing pigment and bright flake are not intended to replace or otherwise be indistinguishable from compositions containing 100% pigment flake.

Pigments are often mixed in carriers to form paint or ink. Examples of carriers include polyvinyl alcohol, polyvinyl acetate polyvinylpyrrolidone, poly(ethoxyethylene), poly (methoxyethylene), poly(acrylic) acid, poly(acrylamide), poly(oxyethylene), poly(maleic anhydride), hydroxyethyl cellulose, cellulose acetate, poly(sacchrides) such as gum arabic and pectin, poly(acetals) such as polyvinylbutyral, poly(vinyl halides) such as polyvinyl chloride and polyvinylene chloride, poly(dienes) such as polybutadiene, poly (alkenes) such as polyethylene, poly(acrylates) such as polymethyl acrylate, poly(methacrylates) such as poly methylmethacrylate, poly(carbonates) such as poly(oxycarbonyl oxyhexamethylene, poly(esters) such as polyethylene terephthalate, poly(urethanes), poly(siloxanes), poly (suphides), poly(sulphones), poly(vinylnitriles), poly(acrylonitriles), poly(styrene), poly(phenylenes) such as poly(2,5 dihydroxy-1,4-phenyleneethylene), poly(amides), natural rubbers, formaldahyde resins, other polymers and mixtures of polymers and polymers with solvents.

Figure 3A:
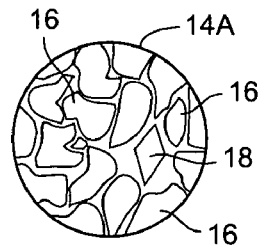
FIG. 3A is a simplified plan view of a portion 14A of the security feature 14 shown in FIG. 1.

FIG. 3A is a simplified plan view of a portion 14A of the security feature 14 shown in FIG. 1. The portion 14A of the security feature is viewed under magnification, typically about 50×-300×, in order to see the shape of the flakes, which are typically about 5-100 microns across, more typically about 20-40 microns across. The security feature was printed using ink including base pigment particles 16 and a covert pigment flake 18 having a selected shape, in this case a "diamond" shape. The optical characteristics and concentration of the covert pigment flake is chosen so as to not disturb the visual appearance of a composition made with the base pigment particles.

The base pigment particles 16 are illustrated as being irregularly shaped flakes. Alternatively, base pigment flakes have a selected (i.e. regular) shape. Similarly, the covert pigment flake 18 could have a grating. The addition of a grating further increases the difficulty of counterfeiting. In some embodiments, the covert pigment flake 18 has generally the same optical characteristics as the base pigment particles. Alternatively, the covert pigment flake 18 has different optical characteristics as the base pigment particles but is present in sufficiently small quantities so as not to disturb the visual appearance of a composition made with the base pigment particles.

In a particular embodiment, the "diamond-shaped" covert flakes were bright flakes about 25 microns by 35 microns across. The shaped flakes were made by embossing a diamond pattern into a roll of PET deposition substrate material, and then depositing a standard thin-film design for bright flake (e.g. about 100-60 nm of Al between layers of $MgF_2$ that are each about 400 nm thick). The total thickness for this bright flake is about 900 nm, which is about one micron. The embossed pattern is also known as a "frame" (as opposed to a grating which is intended to produce a pattern in or on the flake), and is positive in some embodiments and negative in other embodiments.

The combination of a metal layer with one or more dielectric layers facilitates removal of the flake from the deposition substrate. A thin film stack having only dielectric layers is brittle and often has residual stresses from the deposition process. Such thin film stacks tend to break more randomly, resulting in fewer shaped flakes. An all-metal stack or single layer is difficult to process into patterned flakes according to the frame of the deposition substrate because the metal is relatively ductile. In particular embodiments, metal-dielectric and dielectric-metal-dielectric flake having a total thickness of between about 0.5 microns and about 3 microns provides a good combination of ductile and brittle characteristics that result in good patterning of the flake when it is removed from the substrate and processed. In a particular embodiment, shaped bright flake having a total thickness of about one micron of a ductile metal layer between brittle dielectric layers yielded about 90% diamond-shaped flakes from an embossed deposition substrate.

The thin-film layers were stripped from the deposition substrate and processed into flake using conventional techniques. The embossed diamond pattern provided lines along which the thin-film layers broke into flakes having the selected diamond shape. In another embodiment, the diamond-shaped flakes were about 12 microns by 16 microns and included a grating on the major surface of the flakes. The grating was nominally 2000 lines/mm and did not produce a noticeable diffractive effect in a composition when used as a taggent. The shape of the 12-by-16 micron flake was easily seen at 100× magnification; however, the grating was not easily seen at this magnification. The grating was readily apparent at 400× magnification. In other embodiments, a grating is more coarse, and is easily seen at the same magnification (e.g. 50× to 100×) that is used to discern the shape of the taggent flakes. Thus, gratings used to provide a security feature to taggent flakes do not have to be optically active in the visible portion of the spectrum.

In a particular embodiment, the base pigment particles are flakes of mica coated with a layer of $TiO_2$ or other dielectric material. The coating material typically has a relatively high index of refraction. Mica is a naturally occurring mineral that is relatively inexpensive and easily processed into flake substrate. When mica flake substrate is coated with a layer of high-index material of a selected thickness, a nacreous pigment flake is obtained. Mica flake substrate can be coated with several alternative materials using a variety of processes. Such pigments are commonly known as "mica-based" pigments. A photocopy of an image printed with such nacreous pigment does not look like the original, thus mica-based pigment flakes are desirable for use to provide overt security features. However, shaping mica flake substrate or providing a symbol on mica flake substrate is impractical. Covert flake according to an embodiment of the present invention is mixed with the mica-based pigment to enable a covert security feature to be included in images printed with mica-based pigment flakes. Shaped pigment flakes made of a single layer of inorganic dielectric material, such as $TiO_2$ or ZnS, have an appearance similar to a mica-based pigment if the covert pigment flake has a thickness about five times the quarter-wave optical thickness ("QWOT") at a wavelength in the visible spectrum. Typically, a single-layer covert flake of ZnS intended to match the appearance of a mica-based pigment has a thickness of about 60 nm to about 600 nm. Processing all-dielectric flake from a deposition substrate having an embossed diamond-shaped pattern tends to have a lower yield than a counterpart metal-dielectric flake.

Figure 3B:
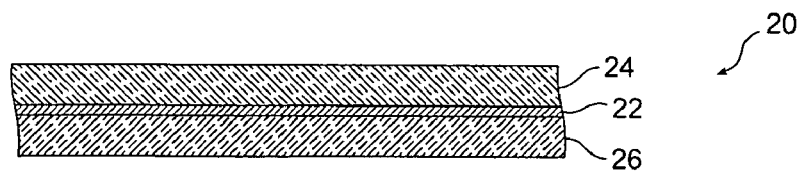
FIG. 3B is a simplified cross section of a bright pigment flake 20 according to an embodiment of the present invention.

FIG. 3B is a simplified cross section of a bright pigment flake 20 according to an embodiment of the present invention. A reflective layer 22 is between two dielectric thin-film layers 24, 26. The dielectric thin-film layers 24, 26, provide stiffness to the bright pigment flake 20 and facilitate removal of the pigment flake from the roll coater substrate. It is desirable to keep the bright pigment flake less than 10 microns thick to provide a composition that dries or cures to a smooth surface. In particular embodiments, the thickness of the flake is between about 1 micron and about 3 microns. Thinner flakes tend to be more difficult to process and handle because they weigh so little, and thicker flakes are stronger, and hence more difficult to break along the frame pattern.

The reflective layer 22 is typically a thin-film layer of a highly reflective metal such as aluminum, platinum, gold, silver, or copper, or a moderately reflective metal, such as iron or chromium. The reflective layer 22 is sufficiently thick to be opaque (reflective) in the visible portion of the spectrum, but not so thick as to interfere with separation of the thin-film layers from the substrate and subsequent processing into flake. In other words, a metal reflective layer that was too thick would provide a ductile layer between the relatively brittle dielectric layers 24, 26 and tend to interfere with processing the deposited layers into flakes. Suitable materials for the dielectric layers include ZnS, $MgF_2$, $SiO_2$, $Al_2O_3$, $TiO_2$, $Nb_2O_5$, and $Ta_2O_5$, among others. In some embodiments, the dielectric thin-film layers 24, 26 also provide environmental protection for the reflective layer 22.

The bright flake 20 has a selected shape, and optionally or alternatively has other indicia, such as a surface (grating) pattern or an elemental fingerprint. In sufficiently low concentrations, the bright flake 20 is added to colored pigment and colored compositions (e.g. inks and paints). Shaped bright flake can be added to base (i.e. randomly shaped or alternatively shaped) bright flake as a covert security feature.

Figure 3C:
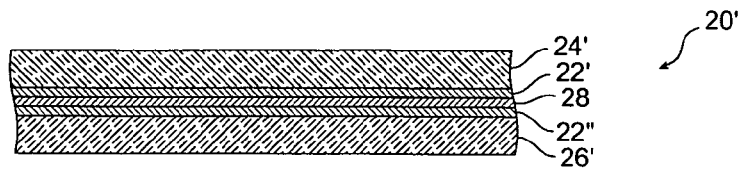
FIG. 3C is a simplified cross section of a bright flake 20' providing an elemental fingerprint.

FIG. 3C is a simplified cross section of a bright flake 20' with an elemental indicator layer 28. The bright flake 20' has reflective layers 22', 22" between dielectric layers 24', 26', and a layer 28 providing an elemental indicator. The elemental indicator layer 28 is a layer of material that is not found in a base pigment that the bright flake will be used with, and that is readily detectable using elemental analysis techniques, such as secondary ion mass spectrometry ("SIMS"), energy dispersive X-ray ("EDX") and Auger analysis. Furthermore, the elemental indicator is present in the covert flake but not in the base flake, and micro-SIMS, micro-EDX or micro-Auger analysis easily detects this difference. Merely adding the indicating element to the pigment mixture (e.g. adding a small amount of a compound containing the indicating element to the carrier) would not overcome this security feature.

The elemental indicator layer 28 is not optically active because it is between the two opaque reflective layers 22', 22". The reflective layers 22', 22" are selected to be of the same material used in the base flake, such as aluminum. Suitable materials for an elemental indicator include platinum, iridium, osmium, vanadium, cobalt, and tungsten, among others. Those of skill in the art appreciate that the elemental indicator material chosen depends on the base pigment it will be used with. In an alternative embodiment, the reflective layer of bright pigment is of an elemental indicator material (see FIG. 3B, ref. num. 22). For example, covert bright or colored pigment flake using platinum as the reflective layer is mixed with base bright flake or colored pigment flake using aluminum as the reflective layer. In a further embodiment, the amount of flake having the elemental indicator incorporated into a pigment mixture or composition is chosen to provide a selected elemental ratio (e.g. aluminum to platinum) in the pigment mixture. In an alternative or further embodiment, the material of the dielectric thin-film layers 24', 26' (FIG. 3B, ref. nums. 24, 26) is chosen to provide an elemental indicator.

Figure 3D:
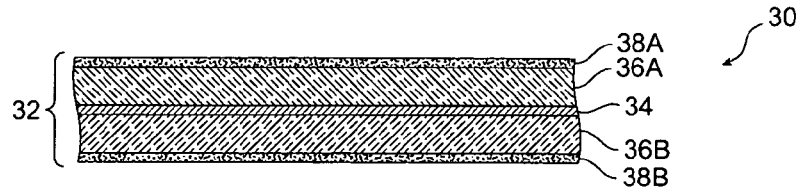
FIG. 3D is a simplified cross section of a color-shifting pigment flake 30 according to another embodiment of the present invention.

FIG. 3D is a simplified cross section of a color-shifting pigment flake 30 according to another embodiment of the present invention. The color-shifting pigment flake 30 is generally known as a symmetrical 5-layer Fabry-Perot interference flake. A thin film stack 32 includes a reflective metal layer 34, two spacer layers 36A, 36B, and two absorber layers 38A, 38B. The absorber layers are typically very thin, semi-opaque layers of chromium, carbon, or other material. The reflector, spacer, and absorber layers are all optically active, that is, they contribute to the optical performance of the color-shifting pigment flake. Each side of the flake provides similar Fabry-Perot interference structures to incident light, and hence the flake is optically symmetrical. Alternatively, the color-shifting pigment flake is an all-dielectric pigment flake.

The color and color travel of the color-shifting pigment flake is determined by the optical design of the flake, namely the material and thicknesses of the layers in the thin film stack 32, as is well-known in the art of optically variable pigments. The optical design of the color-shifting pigment flake 30 is typically chosen to match the optical properties of the base pigment flake that it will be mixed with. The color-shifting pigment flake 30 is shaped (see FIG. 3A, ref. num. 18), and optionally or alternatively includes other indicia, such as a surface grating pattern and/or elemental indicator.

For example, the reflective layer includes an elemental indicator, either a reflective metal that is different than the base pigment flakes, or includes an additional elemental indicator layer(s), which may or may not be optically active (see FIG. 3C, ref. num. 28). Alternatively or additionally, the spacer layers 36A, 36B and/or the absorber layers 38A, 38B include an elemental indicator. For example, if the base pigment flake uses $MgF_2$, $SiO_2$, or $Al_2O_3$ as a spacer layer material, the covert pigment flake 30 uses different spacer layer material, such as $TiO_2$ or ZnS. Spacer and/or absorber indicator materials include elements that are easily detected using elemental analysis.

In some embodiments, using a different spacer material and/or reflector material results in a covert pigment flake 30 that has different optical properties than the base flake. For example, even if the covert and base flakes have similar color at normal incidence, the color travel might be different. Generally, low-index spacer materials (such as $MgF_2$ and $SiO_2$) provide more color travel ("fast shifting" pigments) than high-index spacer materials (such as ZnS and $TiO_2$). However, such covert flakes can be added in relatively high concentrations to the base pigment flake, even if the color travel does not precisely match that of the base flake, because most casual observers cannot detect the difference between a mixture according to an embodiment of the invention and 100% base flake.

Figure 4:
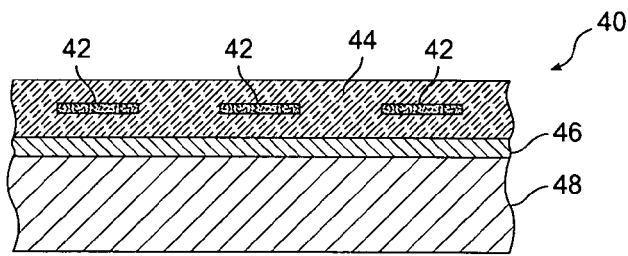
FIG. 4 is a cross section of a varnish with opaque covert flakes dispersed in a carrier according to an embodiment of the present invention.

FIG. 4 is a cross section of a varnish 40 with covert flakes 42 dispersed in a carrier 44 according to an embodiment of the present invention. The carrier is clear or tinted, and the covert flakes 42 are at a concentration selected to avoid casual visual detection. An optional color coat or bright (e.g. "chromed") coating 46 has been applied to an object 48 underneath the varnish 40. The varnish 40 provides a covert security feature to the object without disturbing its appearance. In a particular embodiment, the optional color coat 46 is an image printed with nacreous or color-shifting pigment to provide an overt security feature to the object. The object is a document, product, packaging, or seal, for example. The varnish 40 enables providing a covert security feature to an object that already has a covert security feature without significantly altering the appearance of the object. For example, if stock certificates have been printed with overt security features and it subsequently becomes desirable to provide a covert security feature to the stock certificates, the overt security feature is over-printed with the varnish 40 or a similar ink composition (i.e. an essentially clear ink composition containing covert flakes). In another embodiment, an additional covert security feature is provided to an object already having one or more covert security features. In a particular embodiment, the covert flakes make up not more than 2% of the varnish.

Figure 5:
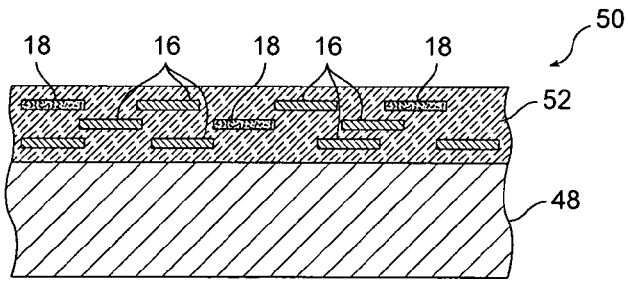
FIG. 5 is a cross section of base flakes and opaque covert flakes dispersed in a binder according to another embodiment of the present invention.

FIG. 5 is a cross section of a composition 50 (e.g. ink or paint) including base pigment flakes 16 and shaped covert flakes 18 dispersed in a binder or carrier 52 according to another embodiment of the present invention. The covert flakes 18 have a selected shape or other indicia, such as an elemental indicator or a surface grating pattern. The composition 50 has been applied to an object 48, such as a label, product packaging, bank note, or consumer item.

Adding covert flake to an existing ink or paint composition provides a covert security feature to images made of the ink or paint. For example, ink with color-shifting pigment is used to provide a color-shifting image as an overt security feature on a bank note or other object. Covert flake according to an embodiment of the present invention is added to the ink, and the resultant mixture is used to print images that appear substantially similar as those printed with the original ink. Thus, a casual observer of the bank note does not notice a change in the appearance of the overt security feature (i.e. color-shifting image) after the covert security feature is added. The indicia of the covert flake indicates a date-of-manufacture, a printing location, and/or the source (manufacturer) of the ink, for example.

III. Experimental Results

A test standard using 100% magenta-to-green optically variable intaglio ("OVI") pigment flake was produced and measured. Both bright and optically variable taggent samples had a grating pattern of 2000 lines/mm, which made the taggent flakes easier to distinguish from the base pigment flake (i.e. locate) and more difficult to counterfeit. The grating pattern was clearly visible at about 400×, and did not induce visible diffractive properties to images printed with the test compositions. It is believed that the low portion of the taggent flakes in combination with not being well oriented to the viewer avoided a diffractive effect from occurring. In an alternative embodiment, a finer grating pattern is included on shaped taggent flakes. The shapes are identifiable under a microscope at a first magnification, but the grating pattern is not easily seen at this first magnification. The grating pattern is seen at a higher magnification. It is believed that including such a grating pattern to taggent flake having a selected shape or symbol further enhances the covert nature of the taggent flake because a counterfeiter might see the shape or a symbol under microscopic examination, but not see the grating pattern, and hence not include it in a counterfeit article.

The first test sample ("sample 1") contained 90% (by weight) of the conventional (base) magenta-to-green pigment flake mixed with 10% magenta-to-green OVI pigment flake with a grating ("taggent flake"). The taggent flakes were easy to detect by routine microscopic inspection, and the color performance of the mixture was the same as the test standard because the color of the taggent flake was well matched to the color of the base flake. Close color matching involves careful monitoring of the production of the taggent flake and a new optical design for each color of taggent flake would generally be used to match each color of base flake.

Another approach is to use a standard taggent flake design that can be used with many different colors of base flake. Bright taggent flake using an aluminum reflector layer (giving the flake a "silver" appearance) was also evaluated. Fabrication of bright flake is relatively simple and these flakes were very easy to detect at a concentration of 5% when mixed with colored base pigment flakes. Bright taggent flakes are used with many colors of base pigment to provide covet security features. The amount of bright taggent flakes in the composition depends on the desired result. For example, the color performance of an intaglio blend containing 5% bright taggent flake mixed with the magenta-to-green OVI base is distinguishable in a side-by-side comparison from a composition of 100% magenta-to-green OVI flake. A composition essentially indistinguishable from 100% magenta-to-green OVI flake uses less than 5% bright flake, such as compositions with concentrations between about 0.25 weight % and 3 weight % of bright taggent flake in magenta-to-green OVI flake. It is believed that bright flake in concentrations greater than 5% may be added to pigment flake providing lighter or less saturated color without noticeably changing the appearance of the composition. Bright taggent flakes are easy to detect under modest magnification, even at concentrations below 1%, because of the combination of having a selected shape and of being a different color (e.g. "silver" instead of magenta).

IV. Exemplary Methods

Figure 6:
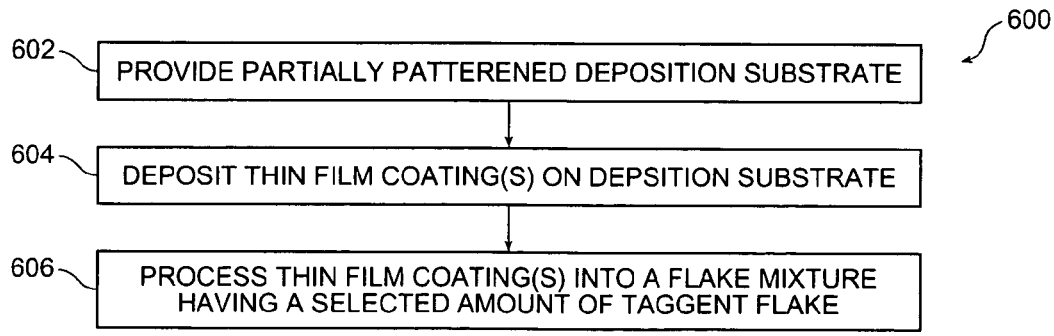
FIG. 6 is a flow chart of a method of making pigment flake according to an embodiment of the present invention.

FIG. 6 is a flow chart of a method 600 of making pigment flake according to an embodiment of the present invention. A roll substrate having a non-embossed ("smooth") portion and an embossed portion in a selected ratio of the deposition surface area of the roll substrate is provided (step 602). In one embodiment, the embossed portion is embossed with a frame for producing flakes having a selected shape. In an alternative embodiment, the embossed portion is embossed with a grating pattern or symbol. In an alternative embodiment, the substrate is patterned using a process other than embossing, such as laser ablation. At least one thin film layer is deposited on the roll substrate (step 604), and the deposited thin film layer(s) is processed into flake (step 606) to result in a flake mixture having a selected amount of taggent flakes. The yield of taggent flake depends on factors such as the type of thin-film layers being processed, the nature of the frame, grating pattern, or symbol, and processing parameters.

For example, referring to FIGS. 2A and 2B, if 10% of the surface of the roll substrate is embossed with a grating or symbol, then a yield of approximately 10% taggent flake having the grating pattern or symbol is expected. If 10% of the surface of the roll substrate is embossed with a diamond-shaped frame, then a yield of about 9% is expected for dielectric-metal-dielectric flake because of the 10% yield loss processing the patterned portion of the thin film stack into shaped flakes. Similarly, a yield of about 5% is expected for shaped all-dielectric flake because of the 50% yield loss processing the patterned portion of the thin film stack into shaped flakes.

While the invention has been described above in terms of various specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

What is claimed is:

1. A coating composition comprising:
   a carrier; and
   a plurality of shaped opaque covert flakes dispersed in the carrier, wherein each of the plurality of shaped opaque inorganic covert taggent flakes has a selected shape and a thickness less than 10 microns, and wherein a first plurality of the shaped opaque inorganic taggent flakes have a same predetermined shape.

2. The coating composition of claim 1 wherein the shaped opaque covert flakes comprise multiple thin film layers.

3. The coating composition of claim 1 wherein the shaped opaque inorganic covert taggent flakes has a thickness between about 0.5 micron and about 3 microns.

4. The coating composition of claim 1 further comprising a second plurality of shaped opaque flakes having a second selected shape, wherein the second plurality of shaped opaque inorganic taggent flakes have a same predetermined shape that is different from the shape of the first plurality of shaped opaque inorganic taggent flakes.

5. The coating composition of claim 4 wherein the shaped opaque covert flakes comprise bright flakes.

6. The coating composition of claim 4 wherein the shaped opaque covert flakes have a grating pattern, the selected shape being visible at a first magnification and the grating pattern not being visible at the first magnification, wherein the grating pattern is visible at a second magnification, the second magnification being greater than the first magnification.

7. The coating composition of claim 1 wherein the shaped opaque covert flakes include a grating pattern.

8. The coating composition of claim 1 wherein the shaped opaque covert flakes include an elemental indicator.

9. The coating composition of claim 8 wherein an optically active layer in the opaque covert flake comprises the elemental indicator.

10. The coating composition of claim 9 wherein the optically active layer is one of a reflective layer, a spacer layer, and an absorber layer.

11. The coating composition of claim 8 wherein the elemental indicator is in a nonoptically active layer.

12. The coating composition of claim 1 further comprising base pigment having a first elemental composition, wherein the shaped opaque covert flakes have a second elemental composition including an elemental indicator not found in the first elemental composition.

13. The coating composition of claim 12 wherein a ratio of base pigment to shaped opaque covert flakes is selected to provide a selected amount of the elemental indicator.

14. The coating composition of claim 1 further comprising a base pigment having a first selected color, the base pigment being mixed with the shaped opaque covert flakes to provide a pigment mixture, wherein the shaped opaque covert flakes are bright flakes having a selected shape, and wherein the shaped opaque covert flakes comprise less than 5 weight % of the pigment mixture.

15. The coating composition of claim 14 wherein the bright flakes comprise less than 1% of the pigment mixture.

16. The coating composition of claim 1 wherein the shaped opaque covert flakes comprise bright flake.

17. The coating composition of claim 1 further comprising base pigment having a selected color, the shaped opaque covert flakes having the selected color.

18. The coating composition of claim 17 wherein the base pigment comprises micabased pigment.

19. The coating composition of claim 17 wherein the base pigment comprises color-shifting pigment.

20. The coating composition of claim 17 wherein the carrier is a varnish.

21. The coating composition as defined in claim 1 wherein at least some of the flakes have a first patterned portion including a frame.

* * * * *